United States Patent
Murakami et al.

(10) Patent No.: US 8,843,833 B2
(45) Date of Patent: Sep. 23, 2014

(54) INFORMATION-PROCESSING DEVICE AND PROGRAM

(75) Inventors: Keiichi Murakami, Tokyo (JP); Dai Kamiya, Tokyo (JP); Yasushi Onda, Tokyo (JP); Izua Kano, Tokyo (JP); Kazuhiro Yamada, Tokyo (JP); Naoki Hashida, Tokyo (JP)

(73) Assignee: NTT DoCoMo, Inc., Tokyo (JP)

(*) Notice: Subject to any disclaimer, the term of this patent is extended or adjusted under 35 U.S.C. 154(b) by 569 days.

(21) Appl. No.: 13/061,810

(22) PCT Filed: Sep. 8, 2009

(86) PCT No.: PCT/JP2009/065679
§ 371 (c)(1),
(2), (4) Date: Mar. 2, 2011

(87) PCT Pub. No.: WO2010/027088
PCT Pub. Date: Mar. 11, 2010

(65) Prior Publication Data
US 2011/0167389 A1    Jul. 7, 2011

(30) Foreign Application Priority Data

Sep. 8, 2008 (JP) .................................. 2008-230221

(51) Int. Cl.
*G06F 3/048* (2013.01)
*G06F 3/0489* (2013.01)
*G06F 3/0481* (2013.01)
*G09G 5/14* (2006.01)
*G09G 5/08* (2006.01)

(52) U.S. Cl.
CPC ............ *G06F 3/04895* (2013.01); *G06F 3/048* (2013.01); *G09G 5/14* (2013.01); *G06F 3/04892* (2013.01); *G09G 5/08* (2013.01); *G06F 3/0481* (2013.01)

USPC .......................................... 715/757; 715/835

(58) Field of Classification Search
USPC .................................................... 715/835, 757
See application file for complete search history.

(56) References Cited

U.S. PATENT DOCUMENTS 7,554,525 B2* 6/2009 Aoyama ....................... 345/157
2003/0014401 A1 1/2003 Goloshubin et al.

FOREIGN PATENT DOCUMENTS

JP 05-150903 A 6/1993
JP 2003-330592 A 11/2003

(Continued)

OTHER PUBLICATIONS

PCT International Search Report; International Application No. PCT/JP2009/065679; Date Mailed Oct. 15, 2009.

(Continued)

*Primary Examiner* — William Bashore
*Assistant Examiner* — Gregory A Distefano
(74) *Attorney, Agent, or Firm* — MKG, LLC (57) ABSTRACT

The information-processing device according to the present invention, if a subject operation direction is "rightward," specifies in a coordinate axis across a rightward direction, a range that overlaps an area between coordinates ($Ya_{min}$ to $Ya_{max}$) of an area where selected window Wa is displayed, and each of areas between coordinates ($Y1_{min}$ to $Y1_{max}$ and $Y2_{min}$ to $Y2_{max}$) of areas where non-selected windows $Wb_1$ and $Wb_2$ are displayed, and determines a window that is selectable subsequently on the basis of the overlapping range. The information-processing device displays a guide image at a position between a window that is selectable subsequently and selected window Wa, and is also within a range that overlaps both an area where a window that is selectable subsequently is displayed, and an area where window Wa is displayed, to guide a subject operation direction.

4 Claims, 7 Drawing Sheets

(56) References Cited

FOREIGN PATENT DOCUMENTS

| JP | 2006-113714 | 4/2006 |
|---|---|---|
| WO | 94/12927 A1 | 6/1994 |
| WO | 9910798 | 3/1999 |

OTHER PUBLICATIONS

Office Action with English Translation; issued in conjunction with Japanese Patent Application No. 2008-230221, Dated Jul. 10, 2012.

First Notification of Office Action issued in corresponding Chinese Patent Application No. 200980135023.0 mailed on Nov. 27, 2012.

Office Action from corresponding Chinese Application No. 2013071800823860, dated Jul. 23, 2013.

Supplementary European Search Report for corresponding EP Application No. EP09811611.4, dated Mar. 6, 2014, pp. 1-3.

Chinese Office Action with English Translation issued in corresponding CN Patent Application No. 200980135023.0, dated Mar. 24, 2014, pp. 1-5.

European Communication issued in corresponding EP Patent Application No. 09 811 611.4, dated Mar. 26, 2014, pp. 1-6.

* cited by examiner

INFORMATION-PROCESSING DEVICE AND PROGRAM

TECHNICAL FIELD

The present invention relates to a GUI (Graphical User Interface).

BACKGROUND

There are two methods for selecting any of plural images (such as windows and icons) displayed on a screen; one is a method using an input device, such as a mouse, that allows selection of any position, and the other is a method using an operation key, such as an arrow key, that indicates a predetermined operation direction. Using the latter method, though a selectable position is limited, operation is easy and an input device is not required. When this method is employed, generally, images are arranged in an operation direction suitable for an operation to be carried out by use of the operation key. For example, if an arrow key is used, images are arranged regularly (in a grid pattern or a line pattern etc.) so that all images can be selected by an operation in one of four directions of right, left, up, and down (or directions other than the four directions).

SUMMARY

The images are not necessarily arranged to be aligned completely in correspondence to an operation direction of an operation key. For example, if an image is described as being located "rightward" of a certain position that is used as a reference, the image actually may be located to the "upper right (oblique upper right)," or to the "lower right (oblique lower right)" when the description "rightward" is interpreted broadly. Therefore, in a case where one image is displayed at a reference position, and other images are displayed respectively to the "upper right" and "lower right" of the one image, if an operation is performed to indicate "rightward" of a selected image, both of the other images can be selected. In this case, if an image is selected subsequently without any judgment criterion being applied to differentiate between selectable images, a user may be prevented from performing an appropriate operation.

An object of the present invention is to make it easier for a user to recognize a window to be selected subsequently, in a case where a selectable position is limited to a position that is located in a predetermined direction, and two or more images are displayed at positions deemed to be located in the predetermined direction.

The present invention provides in an embodiment an information-processing device including: first display means for displaying a plurality of subject images to be selected in a display area of a display; selecting means for selecting a single subject image from the plurality of subject images displayed in the display area; receiving means for receiving an indication of an operation direction; transition means for moving, upon receipt of the indication of the operation direction by the receiving means, if at least one other of the plurality of subject images is displayed in a direction corresponding to the operation direction as viewed from the subject image selected by the selecting means, a subject of selection of the selecting means to one of the at least one other image; and second display means for displaying a guide image between the subject image selected by the selecting means and another subject image that is selectable by a movement of the subject of selection by the transition means, to guide an operation direction indicative of the movement, wherein the transition means includes: coordinate identifying means for identifying, in a case where a coordinate axis across the operation direction is defined in the display area, coordinates in the coordinate axis for both ends of an area where each of the plurality of subject images is displayed; range specifying means for specifying, if two or more other subject images are displayed in the direction corresponding to the operation direction, for each of the two or more other subject images, a range that overlaps both an area between the coordinates identified by the coordinate identifying means for both ends of each of the two or more other subject images, and an area between the coordinates identified by the coordinate identifying means for both ends of the subject image selected by the selecting means; and determining means for determining another subject image that is selectable by the movement on the basis of the range specified by the range specifying means, and the transition means moves the subject of the selection of the selecting means to the other subject image determined by the determining means in response to receipt of the operation direction by the receiving unit.

In a preferred embodiment, the determining means determines, from the two or more other subject images, a subject image having a greater range specified by the specifying means.

Alternatively, the determining means determines, from the two or more other subject images, a subject image having a greater ratio of the range specified by the range specifying means with respect to an area between the coordinates identified by the coordinate identifying means for both ends.

In another preferred embodiment, the transition means includes distance measuring means for measuring a distance between the subject image selected by the selecting means and each of the two or more other subject images, and the determining means determines another subject image that is selectable by the movement on the basis of the range specified by the range specifying means and the distance measured by the distance measuring means.

In another aspect, a program according to the present invention has a feature of causing a computer to serve as an information-processing device. The program according to the present invention may be downloaded to a computer via a network such as the Internet, and installed therein so that the program can be used. The present invention may provide a recording medium, such as an optical disk, that stores the program.

According to aspects of the present invention, where a selectable position is limited to a position that is located in a predetermined direction, and two or more images are displayed at positions deemed to be located in the predetermined direction, an image that is intuitively recognized by a user as being located in the direction is determined to be an image that can be selected subsequently, and a guide image is displayed near the determined image. Accordingly, it is possible to make it easier for a user to recognize an image that can be selected subsequently.

DETAILED DESCRIPTION

Figure 1:
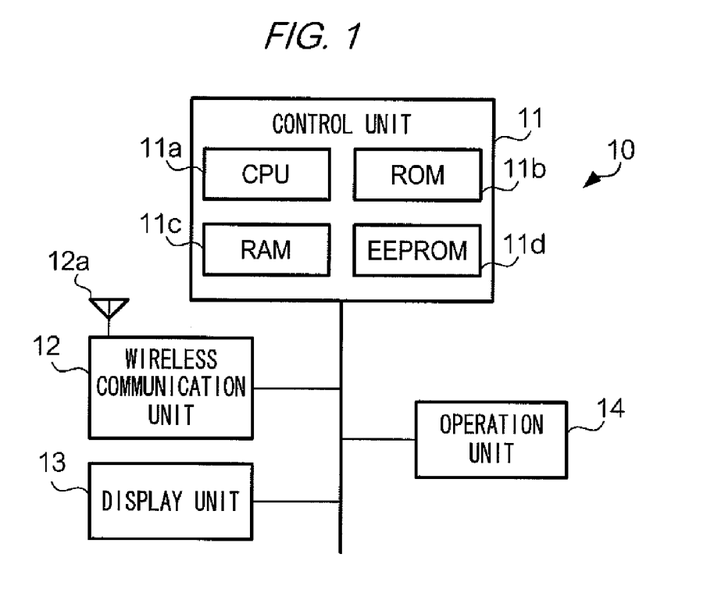
FIG. 1 is a block diagram showing a hardware configuration of a communication terminal device.

FIG. 1 is a block diagram showing a physical configuration of a communication terminal device according to an embodiment of the present invention. As shown in the drawing, communication terminal device 10 includes control unit 11, wireless communication unit 12, display unit 13, and operation unit 14. It is to be noted that communication terminal device 10 according to the present embodiment is a mobile phone having a means for inputting and outputting a voice (not shown) such as a microphone and a speaker.

Control unit 11 includes CPU (Central Processing Unit) 11*a*, ROM (Read Only Memory) 11*b*, RAM (Random Access Memory) 11*c*, and EEPROM (Electronically Erasable and Programmable ROM) 11*d*, and CPU 11*a* executes a program stored in ROM 11*b* or EEPROM 11*d* while using RAM 11*c* as a work area, thereby controlling an operation of each unit of communication terminal device 10. Wireless communication unit 12 includes antenna 12*a*, and performs wireless data communication with a predetermined mobile communication network. Display unit 13 includes a liquid crystal display and a liquid crystal driving circuit, and displays an image in a predetermined display area based on display data provided from control unit 11. Operation unit 14 includes plural keys, and provides operation information to control unit 11, which corresponds to a press operation by a user. Operation unit 14 includes a key for selecting a window (hereinafter referred to as "direction key"). By operating the direction key, a user is able to select a window. It is to be noted that in the present embodiment the direction key is an arrow key whereby one of four directions of rightward, leftward, upward, and downward is selected; however, the direction key may be a key whereby a direction other than the four directions, such as an oblique direction (to the upper right or lower left) may be selected. The keys referred to here may be so-called hard buttons, or a touch sensor that is provided on the liquid crystal display.

It is to be noted that in the present embodiment display unit 13 includes a rectangular display area. The rectangle includes shorter sides that extend in a rightward/leftward direction and longer sides that extend in an upward/downward direction. In the following description, Cartesian coordinates are used to define positions in the display area, where the rightward/leftward direction is defined as X-axis, and the upward/downward direction is defined as Y-axis. The origin of the coordinates may be defined at any position.

ROM 11*b* pre-stores some programs. Hereinafter, the programs will be referred to as "preinstalled programs." The preinstalled programs include a multitask operating system (hereinafter referred to as "multitask OS"), a Java™ platform, and native applications. The multitask OS is an operating system that supports functions such as assignment of a virtual memory space that are necessary to realize pseudo-parallel execution of plural tasks. The Java platform is a set of programs that are described in accordance with a CDC (Connected Device Configuration), which is a configuration for realizing Java Runtime Environment 140 (described later) in communication terminal device 10 in which the multitask OS is installed. The native applications are programs for realizing a basic function of communication terminal device 10 such as a telephone call.

EEPROM 11*d* includes Java application storage areas for storing Java applications. A Java application includes a JAR (Java Archive) file that is a combination of a substance program that describes a procedure in a Java Runtime Environment, and image files or audio files that are used when the substance program is executed; and an ADF (Application Descriptor File) in which properties of installation and start-up of the JAR file are described. The Java application is prepared by a content provider or a carrier, and stored in an external server device, and can be downloaded from the server device on request by communication terminal device 10.

Figure 2:
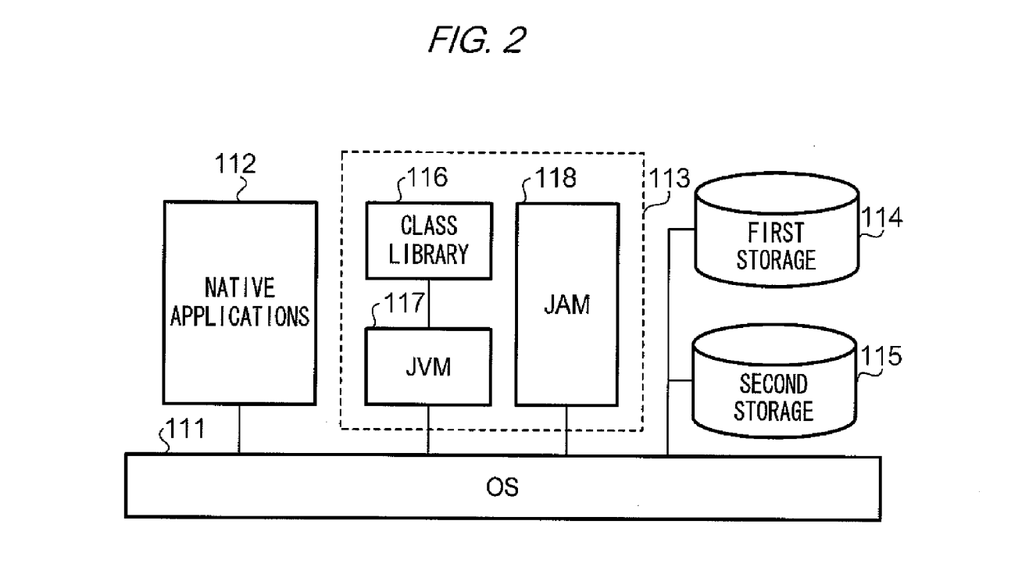
FIG. 2 is a diagram showing a logical configuration of a communication terminal device.

FIG. 2 is a diagram showing a logical configuration of units that are realized by control unit 11 of communication terminal device 10 by executing programs stored in ROM 11*b* and EEPROM 11*d*. As shown in the drawing, in communication terminal device 10 that executes the programs, native applications 112 and Java Runtime Environment 113 are realized in OS 111, and first storage 114 and second storage 115 are secured in EEPROM 11*d*.

Java Runtime Environment 113 is realized by use of the Java platform stored in ROM 11*b*. Java Runtime Environment 113 includes class library 116, JVM (Java Virtual Machine) 117, and JAM (Java Application Manager) 118. Class library 116 is a file of a combination of program modules (classes) that have a particular function. JVM 117 is a Java Runtime Environment that is optimized for the CDC described above, and has a function of interpreting and executing bite codes provided as a Java application. JAM 118 has a function of managing downloading, installation, start-up, and end of Java applications.

First storage 114 is an area for storing Java applications, each of which includes a JAR file and an ADF, which are downloaded under control of JAM 118. Second storage 115 is an area in which an individual storage area is assigned to each installed Java application, and is used for storing data generated during running of Java applications after the applications end. Data of a certain Java application in a storage area assigned to the Java application can be rewritten only when the application is running; therefore, the data cannot be rewritten by another Java application.

Java applications of the present embodiment include applications for displaying plural windows. The Java applications for displaying plural windows include a "list display application" and "widget." The list display application is an application for displaying one or more windows in a display area of display unit 13, and controlling display appearance. The "widget" is an application that realizes a predetermined function on the condition that the list display application displays a window.

A "window" of the present embodiment refers to a part of a display area of display unit 13 that is assigned to a widget, which is displayed as an image that can be distinguished from an image in another part of the display area. Identification information is assigned to windows to identify each window. The shape and size (area) of the window are determined depending on a widget, and may be changed. The window is an example of a "subject image" of the present invention.

In the present embodiment, plural widgets appear, each widget realizing a different function. The widgets include, for example, a widget for displaying a time and date by displaying a clock image in a window (hereinafter referred to as "clock widget"), a widget for displaying characters input by a user in a window as a memorandum (hereinafter referred to as "memo widget"), or a widget for playing a video or music (hereinafter referred to as "play widget"). Also, the widgets may include a widget that acquires information such as news or weather forecast via wireless communication unit 12 at a predetermined time, and displays the acquired information.

The foregoing is a description of the configuration of communication terminal device 10 according to the present embodiment. With the configuration, communication terminal device 10 executes plural applications in accordance with a request input by a user. Communication terminal device 10 according to the present embodiment realizes a multi-window system by displaying windows of widgets. Namely, communication terminal device 10 runs a list display application when displaying plural windows. A user is able to select one from among plural windows, or change a window that has been selected by operating the direction key of operation unit 14. In the following description, a window that has been selected will be referred to as a "selected window," and a window that has not been selected will be referred to as a "non-selected window" for convenience of explanation. It is to be noted that in the present embodiment the "selection" of a window means providing an input focus to the window.

Communication terminal device 10 puts a widget corresponding to a window that has been selected by a user to a state in which the widget carries out an operation that is different from an operation carried out when the window has not been selected. Namely, each widget is able to carry out different operations depending on whether a window corresponding to the widget has been selected. For example, a clock widget is able to carry out an operation to display a time and date when a corresponding window has not been selected, and is able to carry out an operation to change the time and date or the appearance such as a color of a window when the corresponding window has been selected. A memo widget is able to carry out an operation to display characters when a corresponding window has not been selected, and is able to carry out an operation to change (edit) characters when the corresponding window has been selected. A play widget is able to carry out an operation to play a video or music when a corresponding window has not been selected, and is able to carry out an operation to control the volume, or pause or fast-forward a video or music when the corresponding window has been selected. The operations are carried out depending on an operation performed by a user. For example, when a user performs an operation to set a clock, the time is changed accordingly.

Figure 3:
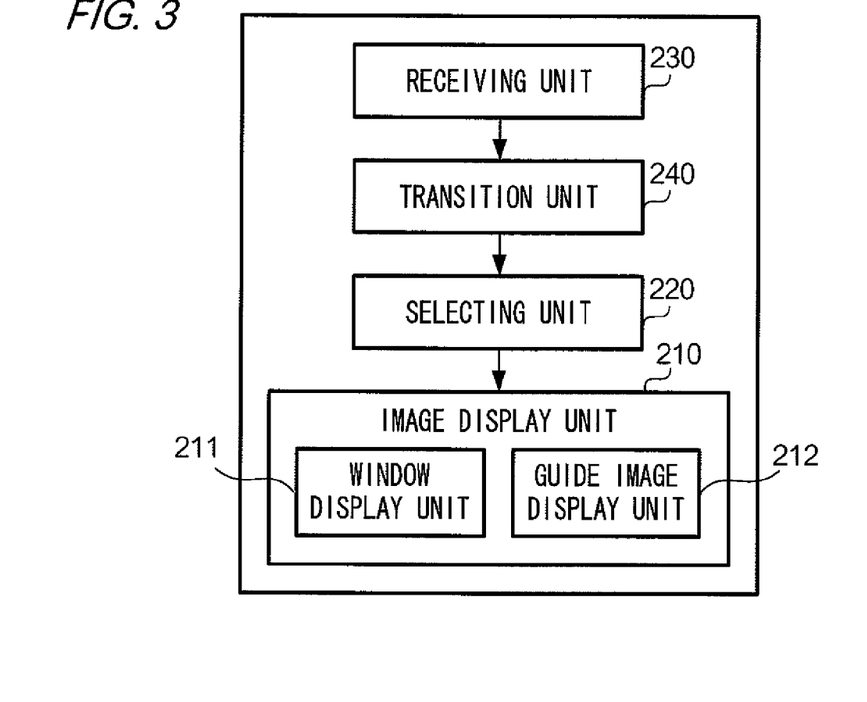
FIG. 3 is a function block diagram showing a function provided by a communication terminal device.

FIG. 3 is a functional block diagram showing functions provided by control unit 11 of communication terminal device 10 when plural windows are displayed. As shown in the drawing, control unit 11 of communication terminal device 10 provides functions corresponding to image display unit 210, selecting unit 220, receiving unit 230, and transition unit 240 by executing a stored program.

Image display unit 210 has a function of displaying an image on display unit 13. Image display unit 210 includes window display unit 211, and guide image display unit 212. Window display unit 211 has a function of controlling display of a window. If plural windows are displayed, window display unit 211 displays a selected window and a non-selected window in such a manner that they can be distinguished from each other. Guide image display unit 212 has a function of displaying an image to guide a window to which selection can be moved, namely a non-selected window that is changeable to a selected window by a given operation (hereinafter referred to as "guide image"). The movement referred to here means changing the subject of selection from one window to another window. The guide image is preferably an image that allows a user intuitively to understand an indicated operation direction; for example, the guide image is an image representing an arrow. It is to be noted that, unlike a selection image of the present invention, the guide image is not the subject of selection.

Selecting unit 220 has a function of selecting a single window from windows displayed on display unit 13, and setting the window as the selected window. If only a single window is displayed on display unit 13, selecting unit 220 sets this window as the selected window. If plural windows are displayed on display unit 13, selecting unit 220 selects a single window in accordance with a predetermined rule. Selecting unit 220 may set a window whose widget was executed most recently as a selected window, or may determine a selected window in accordance with an operation of the direction key by a user. A result selected by the selecting unit 220 is reflected in an image displayed by image display unit 210.

Receiving unit 230 has a function of receiving an instruction to change a selected window. In the present embodiment, a selected window is changed in accordance with an instruction input by a user by operating the direction key to select any of operation directions in a state where a certain window is selected. When acquiring operation information on the operation, receiving unit 230 provides the acquired operation information to transition unit 240.

Transition unit 240 has a function of moving a selected window in accordance with an instruction received by receiving unit 230. Transition unit 240 identifies an operation direction indicated by an instruction received by receiving unit 230. If a non-selected window is displayed in the operation direction as viewed from a selected window, transition unit 240 makes a determination to change the non-selected window to a selected window. A result determined by transition unit 240 is provided to selecting unit 220, and is reflected in an image displayed by image display unit 210.

Figure 4:
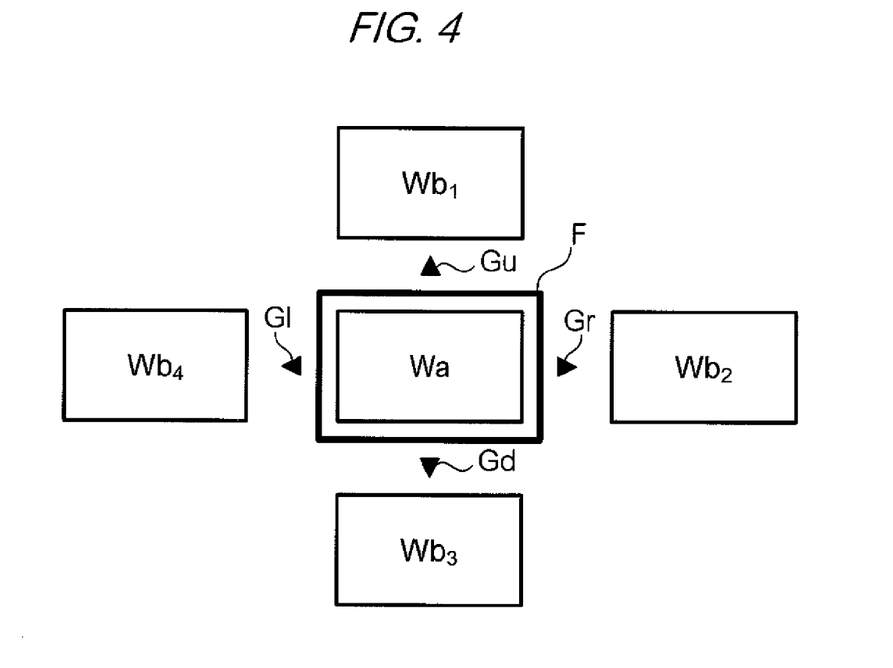
FIG. 4 is a diagram showing an example of display appearance of windows and guide images.
Figure 5:
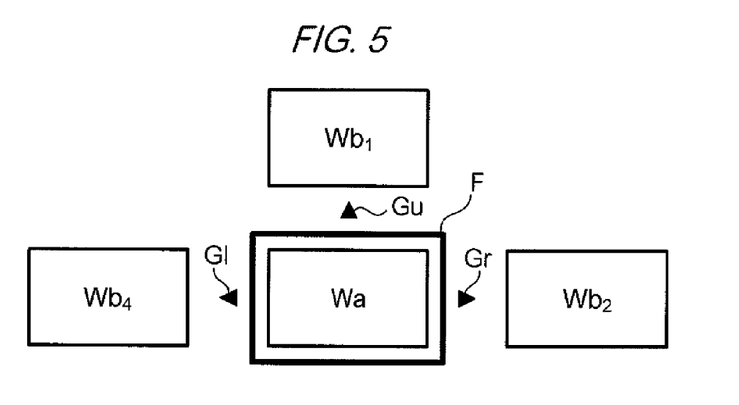
FIG. 5 is a diagram showing an example of display appearance of windows and guide images.

FIGS. 4 and 5 are diagrams showing examples of display appearances of windows and guide images. The drawings show a case where window Wa is a selected window. Image display unit 210 displays frame F around window Wa, which is the selected window, to differentiate the selected window from non-selected windows ($Wb_1$ to $Wb_4$). It is to be noted that a method of differentiating a selected window from a non-selected window is not limited to this example, and a method of blinking a selected window or a method of making a non-selected window appear to be translucent may be employed.

If a non-selected window is displayed in a direction corresponding to an operation direction as viewed from a selected window, image display unit 210 also displays a guide image indicative of each operation direction. For example, in FIG. 4, there are non-selected windows "rightward," "leftward," "upward," and "downward" of window Wa; accordingly, guide images Gu, Gd, Gl, and Gr indicative of the four directions are displayed. In FIG. 5, since no non-selected window is located "downward" of window Wa, a guide image indicative of this operation direction is not displayed. In the following description, a non-selected window that is located in a direction indicated by a guide image is referred to as "candidate window for selection." In other words, the candidate window for selection, in a case where a certain window is a selected window, is a non-selected window that can be a selected window if an operation direction is indicated subsequently, namely, a window that is subsequently changeable to a selected window.

The "direction corresponding to an operation direction" as viewed from a selected window refers to a direction that is deemed to be the operation direction. For example, an operation direction "rightward" referred to here would include "upper right" and "lower right."

Figure 6:
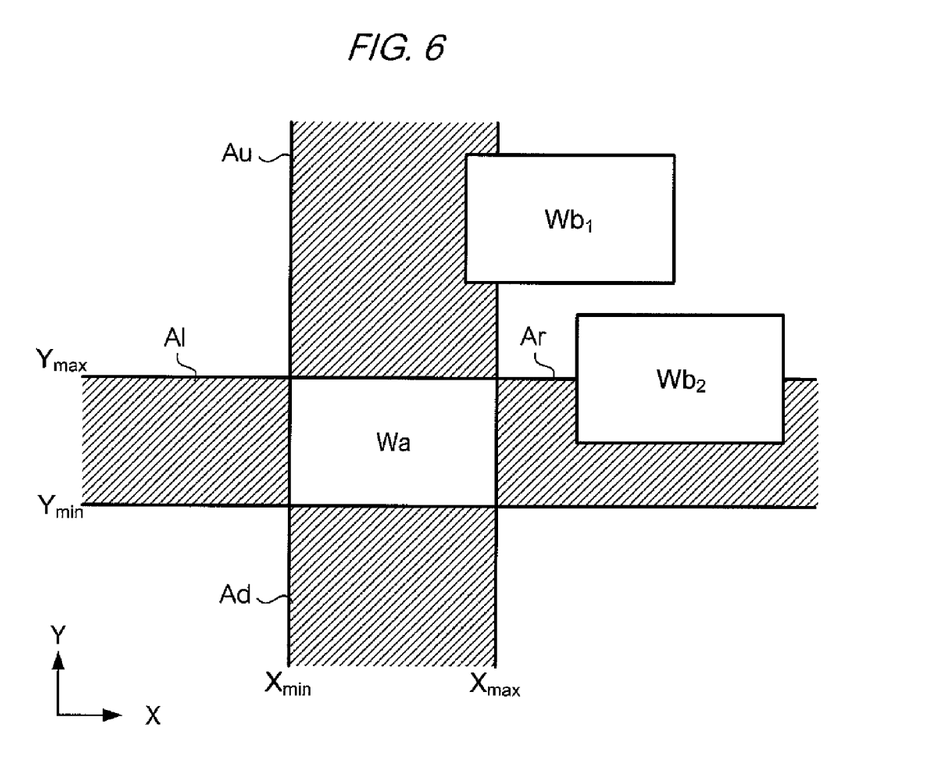
FIG. 6 is a diagram describing a range in a direction corresponding to an operation direction.

FIG. 6 is a diagram describing a range of a direction corresponding to an operation direction according to the present embodiment. For example, a window that is deemed to be located "rightward" is a window at least part of which is located in area Ar shown in the drawing. Area Ar is defined by identifying a maximum value and minimum value in X-axis and Y-axis of an area where selected window Wa is displayed. Area Ar is an area that has an X-axial coordinate greater than or equal to "$X_{max}$," and a Y-axial coordinate greater than or equal to "$Y_{min}$" and smaller than or equal to "$Y_{max}$."

Similarly, if an area that has an X-axial coordinate greater than or equal to "$X_{min}$" and smaller than or equal to "$X_{max}$," and a Y-axial coordinate greater than or equal to "$Y_{max}$" is defined as area Au, a window that is located "upward" of window Wa is included in area Au at least in part. In the same manner, a window that is located "leftward" of window Wa is included in area Al at least in part, and a window that is located "downward" of window Wa is included in area Ad at least in part. Accordingly, window $Wb_1$ shown in FIG. 6 is a non-selected window that is located "upward" of selected window Wa, and window $Wb_2$ shown in FIG. 6 is a non-selected window that is located "rightward" of selected window Wa.

When a directional range that is deemed to be an operation direction is expanded as described above, plural non-selected windows may be included in this range. Communication terminal device 10 has a judgment criterion being applied to determine a single non-selected window from among the plural non-selected windows, so that a single non-selected window becomes a candidate window for selection if an operation direction in which plural windows exist is indicated in such a case.

Figure 7:
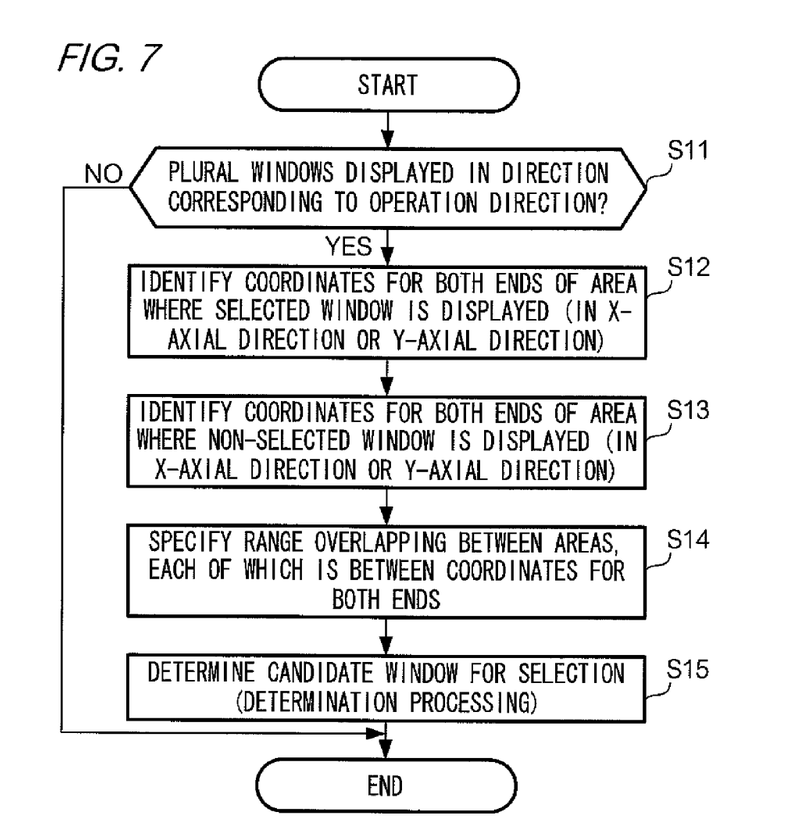
FIG. 7 is a flowchart showing processing in which a single candidate window for selection is determined from plural non-selected windows.

FIG. 7 is a flowchart showing processing in which a candidate window for selection is determined from plural non-selected windows. Communication terminal device 10 performs the processing for each operation direction. Namely, communication terminal device 10 performs the processing for each of four directions, rightward, leftward, upward, and downward.

It is to be noted that in the present embodiment the processing is performed prior to a movement operation by transition unit 240. This is because, if a candidate window for selection has not been determined, guide images cannot be displayed at an appropriate position. Also, by performing the processing prior to the movement operation, it is possible to complete the movement operation faster than in a case where the processing is performed after an instruction for movement has been received.

Control unit 11 firstly determines whether plural non-selected windows are displayed in a direction corresponding to a subject operation direction (any of rightward, leftward, upward, and downward) (step S11). If plural non-selected windows are not displayed in the direction corresponding to the subject operation direction, since a candidate window for selection is determined uniquely, or there is no candidate window for selection, the present processing is not needed. Accordingly, if plural non-selected windows are not displayed in the direction corresponding to the subject operation direction, control unit 11 ends the present processing.

If plural non-selected windows are displayed in the direction corresponding to the subject operation direction, control unit 11 identifies an area where each of a selected window and the non-selected windows is displayed, and also identifies coordinates for both ends of each specified area in a direction that is orthogonal to the subject operation direction (step S12, S13). If the subject operation direction is "rightward," namely, in the X-axial direction, control unit 11 identifies Y-axial coordinates for a top end and bottom end of each window. The identified coordinates are coordinates corresponding to "$Y_{min}$" and "$Y_{max}$" shown in FIG. 6. It is to be noted that since processing in step S12 and processing in step S13 have a difference only in the subject of identification of coordinates, that is, whether the subject window is a selected window or a non-selected window, the processing may be performed in reverse order.

Upon identifying of the coordinates for both ends of each of the above windows, control unit 11 specifies, for each of the non-selected windows, a range that overlaps both an area between the coordinates identified in step S12 for both ends of the selected window, and an area between the coordinates identified in step S13 for both ends of the non-selected window (step S14).

Figure 8:
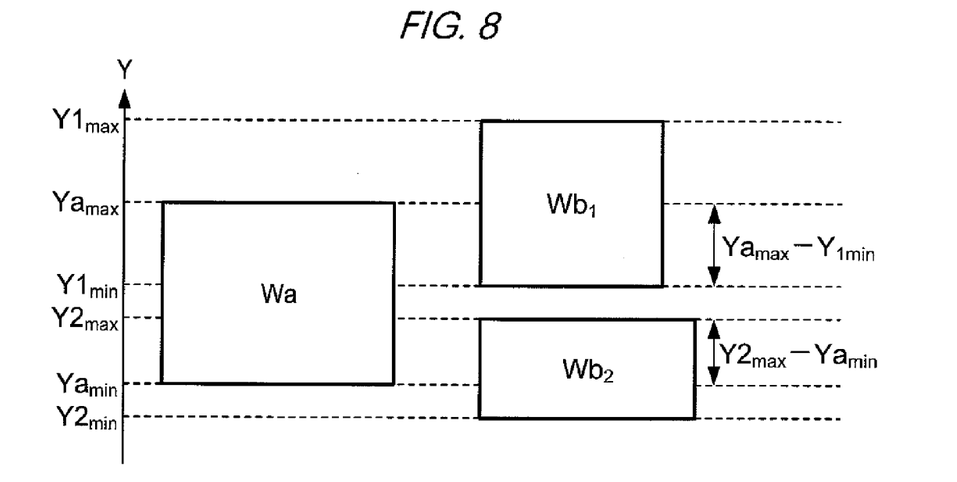
FIG. 8 is a diagram describing an overlapping range.

FIG. 8 is a diagram describing processing in step S14. In the drawing, "$Ya_{max}$" is a maximum value in the Y-axial direction of an area where selected window Wa is displayed, and "$Ya_{min}$" is a minimum value of the area. Similarly, "$Y1_{max}$" is a maximum value in the Y-axial direction of an area where non-selected window $Wb_1$ is displayed, and "$Y1_{min}$" is a minimum value of the area. "$Y2_{max}$" is a maximum value in the Y-axial direction of an area where non-selected window $Wb_2$ is displayed, and "$Y2_{min}$" is a minimum value of the area. In this case, "$Ya_{max}$-$Y1_{min}$" defines a range that overlaps both an area between coordinates for both ends of selected window Wa, and an area between coordinates for both ends of non-selected window $Wb_1$. Similarly, "$Y2_{max}$-$Ya_{min}$" defines a range that overlaps both an area between coordinates for both ends of selected window Wa, and an area between coordinates for both ends of non-selected window $Wb_2$.

When specifying the overlapping range in step S14, control unit 11 performs processing to determine a candidate window for selection based on the specified overlapping range (step S15). The processing is referred to hereinafter as "determination processing." In the determination processing, a candidate window for selection is determined on the basis of the overlapping range specified in step S14. For example, in the determination processing, a candidate window for selection may be determined on the basis of a size of the overlapping range, or may be determined on the basis of a ratio of the overlapping range with respect to an area between coordinates identified in step S13 for both ends of each non-selected window. Referring to FIG. 8, in the former, a size of area "$Ya_{max}$-$Y1_{min}$" and a size of area "$Y2_{max}$-$Ya_{min}$" are compared. In the former case, control unit 11 determines a non-selected window that has a greater overlapping range (in the drawing, non-selected window $Wb_1$) as the candidate window for selection. On the other hand, again referring to FIG. 8, in the latter, ratio "($Ya_{max}$-$Y1_{min}$)/($Y1_{max}$-$Y1_{min}$)" and ratio "($Y2_{max}$-$Ya_{min}$)/($Y2_{max}$-$Y2_{min}$)" are compared. In the latter case, control unit 11 determines a non-selected window that has a greater ratio of overlapping range (in the drawing, non-selected window $Wb_2$) as the candidate window for selection.

Figure 9:
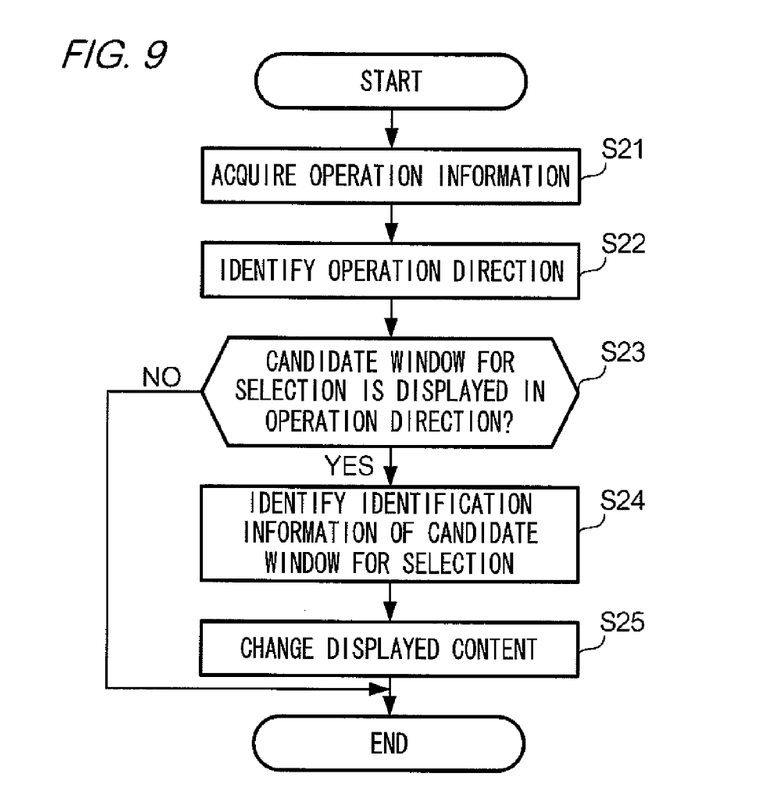
FIG. 9 is a flowchart showing processing performed when an instruction for changing a selected window has been received.

FIG. 9 is a flowchart showing processing performed when an instruction for changing a selected window has been received. When this instruction has been received, control unit 11 acquires operation information corresponding to the instruction to change a selected window (step S21), and identifies an operation direction indicated by the operation information (step S22). Control unit 11 determines whether a candidate window for selection is displayed in the identified operation direction (step S23). If the candidate window for selection is not displayed in the identified operation direction, control unit 11 ends the processing without changing a selected window.

If the candidate window for selection is displayed in the operation direction identified in step S22, control unit 11 identifies identification information of this candidate window for selection (step S24). Control unit 11 sets the candidate window for selection identified by the identification information to a new selected window, and causes the change to be reflected in a content displayed by display unit 13 (step S25). In this step, the position of a guide image, the position of an image that represents a selected window (for example, frame F shown in FIG. 4), and so on are changed. Therefore, processing shown in FIG. 7 is also performed in this step.

The guide image is displayed at an appropriate position between the selected window and the candidate window for selection. The display position of the guide image is, for example, determined as described below.

Figure 10:
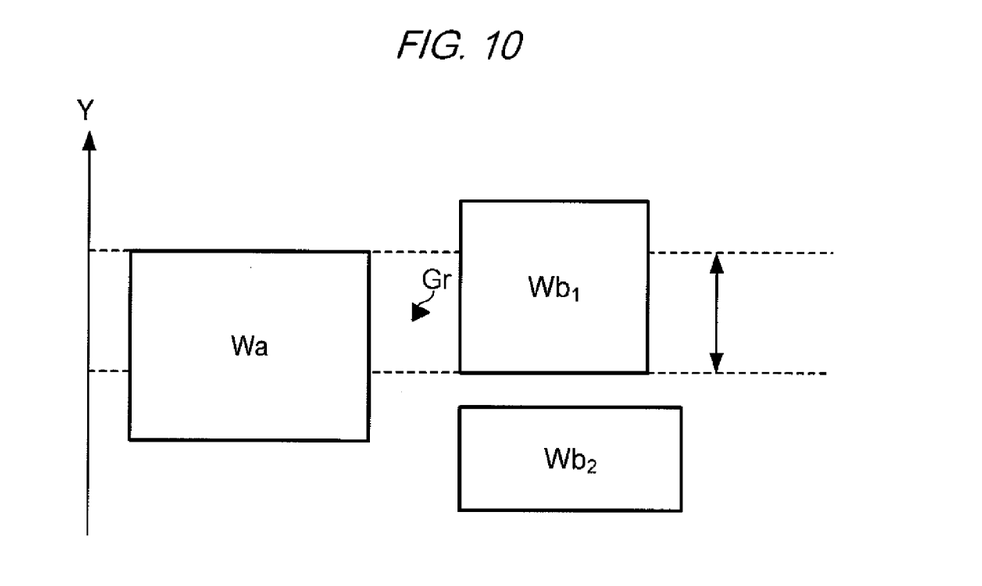
FIG. 10 is a diagram describing a display position of a guide image.
Figure 11:
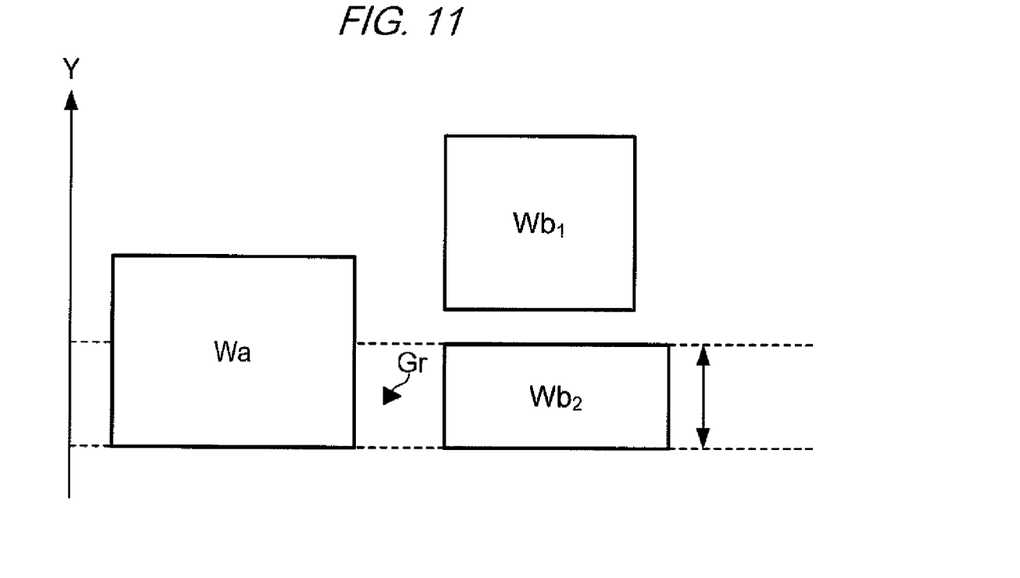
FIG. 11 is a diagram describing a display position of a guide image.

FIGS. 10 and 11 are diagrams describing a display position of a guide image. When displaying guide image Gr, control unit 11 uses the overlapping range specified in the above step S14. Therefore, in a case where a display position of a guide image is determined in accordance with this example, even if only a single non-selected window is displayed in a direction corresponding to the subject operation direction in the above step S11, control unit 11 acquires coordinates with respect to the operation direction (steps S12 and S13).

Control unit 11 specifies a range that overlaps both an area between the coordinates identified for both ends of the selected window, and an area between the coordinates identified for both ends of the candidate window for selection, and determines a midpoint of the overlapping range as a display position of guide image Gr. By this determination, a coordinate in an axial direction orthogonal to the operation direction is determined. A coordinate in an axial direction parallel to the operation direction may be a midpoint of the selected window and the candidate window for selection, or may be a position closer to any of the windows. In FIG. 10, window $Wb_1$ is a rightward candidate window for selection. In FIG. 11, window $Wb_2$ is a rightward candidate window for selection. As shown in the drawings, a display position of guide image Gr is changed on the basis of a display position of a candidate window for selection with respect to the selected window.

As described above, according to communication terminal device 10 of the present embodiment, a guide image indicates which non-selected window is a candidate window for selection; thus, it is possible to make it easier for a user to recognize a window that is subsequently changeable to a selected window if plural windows are displayed in a directional range that is deemed as an operation direction.

In addition, if plural non-selected windows are displayed in a directional range that is deemed to be an operation direction, communication terminal device 10 determines a candidate window for selection based on the above "overlapping range" or "ratio." A window that has greater "overlapping range" or greater "ratio" can be deemed to be more suitable for an operation direction when the operation direction is interpreted narrowly. For example, when a window is a rectangle or square, a window having a greater "overlapping range" has a side closer to a straight line that extends from the center of a selected window in a subject operation direction, as compared with that of other windows. A window having a greater "ratio" has its center closer to a straight line that extends from the center of a selected window in a subject operation direction, as compared with that of other windows. Such a window is perceived by a user as more "suitable for an operation direction." Thus, according to communication terminal device 10 of the present embodiment, it is possible to determine a window that is intuitively recognized by a user as being located in a subject operation direction as a candidate window for selection.

The present invention may be implemented in an embodiment that is different from the above embodiment. For example, the present invention may be implemented in the embodiments described below. It is to be noted that the following modifications may be combined with each other.

In the present invention, when a candidate window for selection (in other words, a subject image that is selectable subsequently) is determined, "distance" between a selected window and a non-selected window may be considered in addition to the above "overlapping range" and "ratio." The "distance" may be a length of a straight line that connects the center of a selected window and the center of a non-selected window, or alternatively may be a length of the shortest straight line among straight lines that connect any positions in an area where a selected window is displayed and any positions in an area where a non-selected window is displayed.

In a case where the above embodiment is applied to this modification, control unit 11 measures a distance in the following manner, and determines a candidate window for selection based on the measured distance and the above overlapping range (or its ratio). When using the distance and the overlapping range in combination, plural methods can be employed by control unit 11. For example, if there are plural non-selected windows that have the greatest overlapping range, control unit 11 may select a non-selected window that has the shorter distance measured, from the non-selected windows as a candidate window for selection, or alternatively may calculate a point (numerical value) depending on a size of the overlapping range, and a point depending on the distance measured, and select a candidate window for selection based on the combined points.

An "operation direction" referred in the present invention is not limited to the above four directions of rightward, leftward, upward, and downward, but it may include more than four or fewer than four directions. For example, the operation direction may include three directions or eight directions. For example, if a so-called numerical keypad is used instead of the direction key, operation directions of right, left, up, and down may be indicated by four keys of "2," "4," "6," and "8," and oblique operation directions may be indicated by four keys of "1," "3," "7," and "9."

Figure 12:
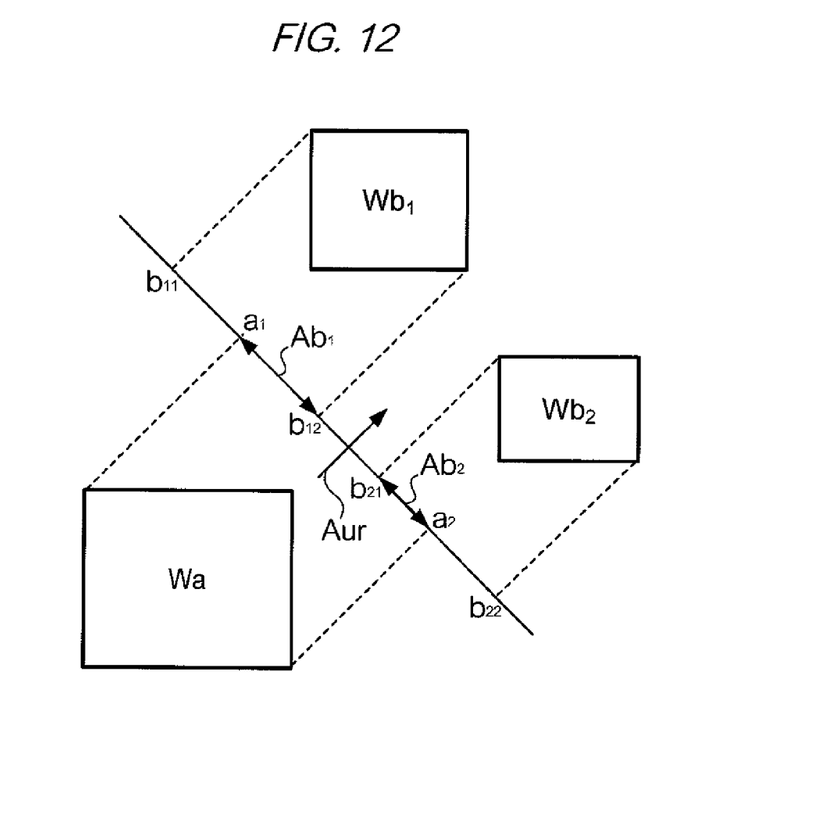
FIG. 12 is a diagram describing a method for specifying an overlapping range in a case where an operation direction includes an "upper right" direction.

FIG. 12 is a diagram describing a method for specifying an overlapping range in a case where operation directions include "upper right." The "upper right" refers to a direction indicated by arrow Aur shown in the drawing. In the drawing, window Wa is a selected window, and windows $Wb_1$ and $Wb_2$ are non-selected windows.

In a case where operation directions include such a direction, control unit 11 defines a coordinate axis that is orthogonal to the operation direction in a display area, identifies coordinates for both ends of each of a selected window and non-selected windows in the coordinate axis, and specifies an overlapping range in the same manner as in the above embodiment. In FIG. 12, coordinates $a_1$ and $a_2$ are coordinates for both ends of window Wa, coordinates $b_{11}$ and $b_{12}$ are coordinates for both ends of window $Wb_1$, and coordinates $ba_{21}$ and $b_{22}$ are coordinates for both ends of window $Wb_2$. In this case, range ($a_1$ to $b_{12}$) indicated by arrow $Ab_1$ is an overlapping range for window $Wb_1$, and range ($b_{21}$ to $a_2$) indicated by arrow $Ab_2$ is an overlapping range for window $Wb_2$.

In the present invention, the coordinate axis defined for specifying an overlapping range is preferably a direction orthogonal to an operation direction, namely, a direction at 90 degrees with respect to an operation direction; however, it only needs to be a direction that crosses an operation direction. Accordingly, the coordinate axis need not be a direction at exactly 90 degrees with respect to an operation direction, but declination is permitted. In the above embodiment and this embodiment, it is considered that the "orthogonal" includes a range that is substantially deemed to be orthogonal.

In the present invention, a window may have plural display appearances used when the window is selected. In this case, the plural display appearances may be changed by the predetermined operation in a stepwise manner.

Figure 13:
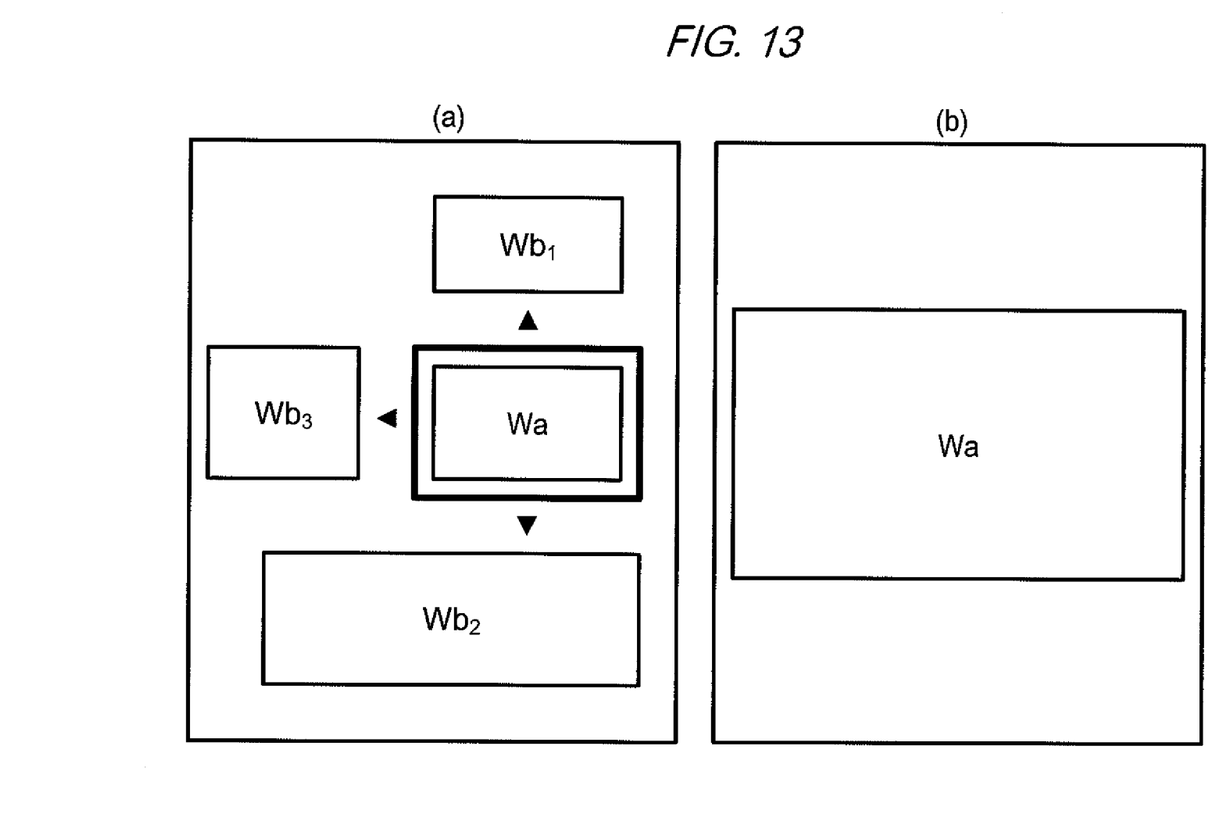
FIG. 13 is a diagram showing an example of a display appearance of a selected window.

FIG. 13 is a diagram showing a display appearance of a selected window. In FIG. 13(a), selected window Wa is displayed together with non-selected windows $Wb_1$ to $Wb_3$. In FIG. 13(b), only enlarged selected window Wa is displayed. For example, if windows are displayed to appear as shown in FIG. 13(a), and each window is too small for content thereof to be recognized, an enlarged window may be displayed as shown in FIG. 13(b).

Alternatively, the enlarged window shown in FIG. 13(b) may be displayed by a predetermined operation after a screen shown in FIG. 13(a) is displayed. In this case, a display appearance of a selected window includes two phases, a phase shown in FIG. 13(a); and a phase shown in FIG. 13(b). In a case where a display appearance of a selected window is changed in a stepwise manner, a widget may be capable of executing different processing for each display phase of a selected window. For example, the above clock widget may display a time and date in a predetermined display appearance during a non-selected period, and may display a time and date in a display appearance different from that of the non-selected period during the phase shown in FIG. 13(a), and may execute processing to change the time and date or a display appearance in the phase shown in FIG. 13(b). In this case, only time may be displayed during the non-selected period, and the date and day of the week may be displayed together with the time during a selected period.

A window according to the present invention may be not only a display area assigned to a "widget" of the above embodiment, but also a display area assigned to another application such as a native application. Also, a widget may be not only a Java application, but also another application. Also, in the above embodiment where display of plural windows is enabled by executing a list display application, which is a Java application, display of plural windows may be enabled by another application, such as an OS.

Also, a widget may acquire information via a means other than wireless communication unit 12. For example, if an information-processing device according to the present invention has a so-called IC tag, a widget may acquire information stored in the IC tag. Alternatively, if an information-processing device according to the present invention has a GPS (Global Positioning System) positioning function, a widget may acquire location information (a latitude and longitude or a distance from a given point) using the positioning function.

A "subject image" according to the present invention need not be a window if it is an image to be selected by a user operation. The "subject image" according to the present invention is any image displayed in a certain range of a display area, which can be selected by a user. For example, it may be an icon. Also, the "subject image" according to the present invention is not limited to a still image or a moving image, and includes characters and symbols.

In the above embodiment, control unit 11 may be deemed to correspond to an information-processing device according to the present invention, or communication terminal device 10 may be deemed to correspond to the information-processing device. When communication terminal device 10 is deemed to correspond to the information-processing device, transition means and receiving means are realized by cooperation between control unit 11 and operation unit 14. An operation according to the present invention may be not only a pressing of a key, but also recognition of a voice instruction.

In the above embodiment the present invention is applied to a mobile phone. However, the present invention may be applied to another electronic device. The present invention may be applied to a communication terminal device such as a PDA (Personal Digital Assistance), or an information-processing device such as a camera, a portable music player, or a portable game device. The present invention is particularly suitable for a case where a direction that is indicated for selecting a position is limited, such as a case where the arrow key is used.

The functions shown in FIG. 3, which are realized by communication terminal device 10, may be realized by a collection of programs or by cooperation of plural hardware resources. For example, an operation corresponding to image display unit 210, selecting unit 220, and receiving unit 230, and an operation corresponding to transition unit 240 may be carried out by different programs. Alternatively, the operations may be carried out by different hardware resources.

What is claimed is:

1. An information-processing device comprising:
 first display means for displaying a plurality of subject images to be selected in a display area of a display;
 selecting means for selecting a single subject image from the plurality of subject images displayed in the display area;
 receiving means for receiving an indication of an operation direction;
 transition means for moving, upon receipt of the indication of the operation direction by the receiving means, if at least one other of the plurality of subject images is displayed in a direction corresponding to the operation direction as viewed from the subject image selected by the selecting means, a subject of selection of the selecting means to one of the at least one other image; and
 second display means for displaying a guide image between the subject image selected by the selecting means and another subject image that is selectable by a movement of the subject of selection by the transition means, to guide an operation direction indicative of the movement, wherein
 the transition means includes:
 coordinate identifying means for identifying, in a case where a coordinate axis across the operation direction is defined in the display area, coordinates in the coordinate axis for both ends of an area where each of the plurality of subject images is displayed;

range specifying means for specifying, when two or more other subject images are displayed in the direction corresponding to the operation direction, for each of the two or more other subject images, a range that overlaps both an area between the coordinates identified by the coordinate identifying means for both ends of each of the two or more other subject images, and an area between the coordinates identified by the coordinate identifying means for both ends of the subject image selected by the selecting means, the range being:

a difference between a first value and a second value, the first value being a maximum value of the coordinates identified for the selected subject image and the second value being a minimum value of the coordinates identified for a first subject image of the two or more other subject images; or a difference between a third value and a fourth value, the third value being a minimum value of the coordinates identified for the selected subject image and the fourth value being a maximum value of the coordinates identified for a second subject image of the two or more other images;

determining means determines, from the two or more other subject images, a subject image having a greater ratio of the range specified by the range specifying means with respect to an area between the coordinates identified by the coordinate identifying means for both ends, the ratio is:

a ratio of the difference of the first value and the second value to a difference between the second value and a fifth value, the fifth value being a maximum value of the coordinates identified for the first subject image; or a ratio of the difference between the third value and the fourth value to a difference between the fourth value and a sixth value, the sixth value being a minimum value of the coordinates identified for the second subject image; and the transition means moves the subject of the selection of the selecting means to the other subject image determined by the determining means in response to receipt of the operation direction by the receiving unit.

2. The information-processing device according to claim 1, wherein the transition means includes distance measuring means for measuring a distance between the subject image selected by the selecting means and each of the two or more other subject images, and the determining means determines another subject image that is selectable by the movement on the basis of the ratio and the distance measured by the distance measuring means.

3. The information-processing device according to claim 2, wherein the determining means calculates a point depending on the distance measured by the distance measuring means, and determines another subject image that is selectable by the movement based on the calculated point and the ratio.

4. A program stored on a non-transitory medium for causing a computer to execute the steps of:

displaying a plurality of subject images to be selected in a display area of a display;

selecting a single subject image from the plurality of subject images displayed in the display area;

receiving an indication of an operation direction;

moving, upon receipt of the indication of the operation direction, if at least one other of the plurality of subject images is displayed in a direction corresponding to the operation direction as viewed from the subject image selected by the selecting means, a subject of selection of the selecting means to one of the at least one other image; and displaying a guide image between the selected subject image and another subject image that is selectable by a movement of the subject of selection, to guide an operation direction indicative of the movement, wherein the moving step includes:

coordinate identifying step of identifying, in a case where a coordinate axis across the operation direction is defined in the display area, coordinates in the coordinate axis for both ends of an area where each of the plurality of subject images is displayed;

range specifying step of specifying, when two or more other subject images are displayed in the direction corresponding to the operation direction, for each of the two or more other subject images, a range that overlaps both an area between the identified coordinates for both ends of each of the plurality of other subject images, and an area between the coordinates identified in the coordinate identifying step for both ends of the subject image selected by the selecting means, the range being:

a difference between a first value and a second value, the first value being a maximum value of the coordinates identified for the selected subject image and the second value being a minimum value of the coordinates identified for a first subject image of the two or more other subject images; or a difference between a third value and a fourth value, the third value being a minimum value of the coordinates identified for the selected subject image and the fourth value being a maximum value of the coordinates identified for a second subject image of the two or more other images;

determining step of determining, from the two or more other subject images, a subject image having a greater ratio of the range specified by the range specifying step with respect to an area between the coordinate identifying step for both ends, the ratio is:

a ratio of the difference of the first value and the second value to a difference between the second value and a fifth value, the fifth value being a maximum value of the coordinates identified for the first subject image; or a ratio of the difference between the third value and the fourth value to a difference between the fourth value and a sixth value, the sixth value being a minimum value of the coordinates identified for the second subject image; and in the moving step, the subject of the selection to the other subject image determined in the determining step in response to receipt of the operation direction.

* * * * *